US012607472B2

(12) United States Patent
Lee

(10) Patent No.: US 12,607,472 B2
(45) Date of Patent: Apr. 21, 2026

(54) APPARATUS AND METHOD FOR PROVIDING DRIVING INFORMATION AND DRIVING ASSISTANCE OF VEHICLE

(71) Applicants: Hyundai Motor Company, Seoul (KR); Kia Corporation, Seoul (KR)

(72) Inventor: Jeong Tae Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 348 days.

(21) Appl. No.: 18/157,163

(22) Filed: Jan. 20, 2023

(65) Prior Publication Data

US 2024/0044657 A1 Feb. 8, 2024

(30) Foreign Application Priority Data

Aug. 3, 2022 (KR) ......................... 10-2022-0096893

(51) Int. Cl.
| | |
|---|---|
| *G05D 1/00* | (2024.01) |
| *B60K 31/00* | (2006.01) |
| *G01C 21/34* | (2006.01) |

(52) U.S. Cl.
CPC ...... *G01C 21/3469* (2013.01); *B60K 31/0066* (2013.01)

(58) Field of Classification Search
CPC ........................ G01C 21/3469; B60K 31/0066
See application file for complete search history.

(56) References Cited

U.S. PATENT DOCUMENTS

| | | | | |
|---|---|---|---|---|
| 9,121,722 | B1 * | 9/2015 | Yu ....................... | G01C 21/3469 |
| 10,352,710 | B2 * | 7/2019 | Sugawara .......... | G01C 21/3415 |
| 2016/0039307 | A1 * | 2/2016 | Okamura ................ | B60L 50/40 |
| | | | | 903/907 |
| 2016/0265930 | A1 * | 9/2016 | Thakur ................ | G05D 1/0088 |
| 2019/0243375 | A1 * | 8/2019 | Stenneth .............. | G06V 20/588 |
| 2022/0205796 | A1 * | 6/2022 | Wray ................. | G01C 21/3407 |

FOREIGN PATENT DOCUMENTS

KR 101077581 B1 4/2011

* cited by examiner

*Primary Examiner* — Vivek D Koppikar
*Assistant Examiner* — Paul W Arellano
(74) *Attorney, Agent, or Firm* — MCDONNELL BOEHNEN HULBERT & BERGHOFF LLP

(57) ABSTRACT

Disclosed are an apparatus and method for providing driving information and driving assistance of a vehicle. A vehicle driving information provision and driving assistance method according to an embodiment of the present invention includes receiving at least one of real=time traffic information, average speed or signal information, or a combination thereof on at least one driving route from a departure point of the vehicle to a destination from at least one server, receiving, from the server, per-segment information of at least one segment generated by segmenting the driving route and per-segment reference fuel efficiency information, calculating a drivable speed and a number of stops per segment based on at least one of the real-time traffic information, average speed or signal information, or a combination thereof, and notifying a driver of an optimal route selected based on the reference fuel efficiency information, the drivable speed, and the number of stops.

16 Claims, 10 Drawing Sheets

APPARATUS AND METHOD FOR PROVIDING DRIVING INFORMATION AND DRIVING ASSISTANCE OF VEHICLE

CROSS-REFERENCE TO RELATED APPLICATIONS

The present application claims priority to Korean Patent Application No. 10-2022-0096893, filed on Aug. 3, 2022, the entire contents of which is incorporated herein for all purposes by this reference.

TECHNICAL FIELD

The present disclosure relates to an apparatus and method for providing driving information and driving assistance of a vehicle, and more particularly, to an apparatus and method for providing driving information and driving assistance for fuel-efficient driving based on a segment.

BACKGROUND

As vehicular culture has become commonplace with recent improvements in living standards, the amount of time a passenger spends in a vehicle is increasing due to long-distance driving such as travel or traffic jams. Accordingly, various convenience facilities and convenience services are provided in the interior of the vehicle for the convenience of passengers staying in the interior of the vehicle for a long time.

A representative of these convenience services is a telematics service. Telematics, a term that combines telecommunication and information science, is defined as a next-generation information provision service for automobiles through the combination of the information technology (IT) industry and the automobile industry, where wireless communication, automobiles, terminals, and contents are organically related.

Using wireless communication technology and Global Positioning System (GPS) technology, telematics services can provide traffic and driving information, emergency response information, remote vehicle diagnostic services, and various services such as the Internet, e-mail, life information, and entertainment through in-vehicle terminals.

Meanwhile, the conventional traffic and driving information guidance service has a drawback of interfering with safe driving because of providing only the predetermined data even when there is a dangerous area on the found driving route from the current location to the destination.

In this regard, Korean Patent Publication No. 10-2011-0043290 (Publication Date: Apr. 27, 2011) titled as "step method for guiding sharp curve of navigation system" proposes a stepwise sharp curve guidance method of a navigation device to help user's drive safely, considering the bending angle of the path and the driving speed of the vehicle.

However, this route guidance method has a drawback of announcing driving information without considering the fuel consumption of the vehicle. In an actual driving environment, fuel consumption varies significantly depending on the number of vehicle stops caused by traffic volume and traffic lights while driving on the road.

Therefore, in the present technical field, there is a need for a driving assistance method capable of improving fuel efficiency of a vehicle in consideration of the number of stops of the vehicle, curvature, and gradient.

SUMMARY

It is a technical object of the present disclosure to provide a vehicle driving assistance apparatus and method that provides the driver with an optimal driving route by delimitating and flexibly updating segments based on curvatures and gradients.

It is another technical object of the present disclosure to provide a vehicle driving assistance apparatus and method that provides the driver with an optimal driving route in consideration of the number of vehicle stops caused by traffic volume and traffic lights on the road.

The technical objects of the present disclosure are not limited to the aforesaid, and other objects not described herein with be clearly understood by those skilled in the art from the descriptions below.

In order to realize the above objects, the method for providing driving information of a vehicle and assisting driving the vehicle may include receiving traffic information on a driving route from a departure point of the vehicle to a destination from at least one server, receiving per-segment information of at least one segment generated by segmenting the driving route and per-segment reference fuel efficiency information, calculating a drivable speed and a number of stops per segment based on the traffic information, and notifying a driver of an optimal route selected based on the reference fuel efficiency information, the drivable speed, and the number of stops.

Here, each segment may be configured to terminate and to start a new segment at a predetermined distance away from a start point of the segment or when a cumulative curvature exceeds a predetermined threshold value or when a road gradient varies more than a predetermined threshold ratio compared to a gradient average of a previous segment.

Here, the method may further include determining whether a segment of interest exists within two segments ahead of the vehicle, notifying, when a segment of interest exists within two segments ahead of the vehicle, the driver approaching the segment of interest, and performing driving assistance for the vehicle in the segment immediately before the segment of interest.

Here, the method may further include determining, by comparing an actual driving fuel efficiency with the driving assistance in the segment in which the driving assistance is performed and a prestored reference fuel efficiency information, whether a difference between the actual driving fuel efficiency and the reference fuel efficiency information is greater than a threshold value, and updating, when the difference between the actual driving fuel efficiency and the reference fuel efficiency information is greater than the threshold value, the server by subdividing the segment of interest.

Here, the method may further include updating, when the difference between the actual driving fuel efficiency and the reference fuel efficiency information is less than the threshold value, by merging segments.

Here, the segment of interest may be a segment in which a cumulative curvature or a gradient exceeds a segment delimitation criterion by a predetermined range or more.

Here, the predetermined distance may be 100 m, the predetermined threshold of curvature accumulation may be 10 degrees, and the predetermined threshold of gradient variation ratio may be 1%.

Here, the driving assistance may include control of acceleration or deceleration of the vehicle.

Here, the segment of interest may be subdivided such that all subdivided segments do not exceed the predetermined cumulative curvature threshold or the predetermined gradient variation ratio threshold.

Here, the segment of interest may be merged such that the merged segment does not exceed, in length, a predetermined maximum segment length.

In addition, in order to realize the above objects, a vehicle providing driving information and driving assistance may include a communication unit receiving traffic information on a driving route from a departure point of the vehicle to a destination, per-segment information of at least one segment generated by segmenting the driving route, and per-segment reference fuel efficiency information from at least one server, a processor calculating a drivable speed and a number of stops per segment based on the traffic information and selecting an optimal route based on the reference fuel efficiency information, the drivable speed, and the number of stops, and an output unit outputting the selected optimal route.

Here, each segment may be configured to terminate and to start a new segment at a predetermined distance away from a start point of the segment or when a cumulative curvature exceeds a predetermined threshold or when a road gradient varies more than a predetermined threshold ratio compared to a gradient average of a previous segment.

Here, the processor may determine whether a segment of interest exists within two segments ahead of the vehicle, instruct, when a segment of interest exists within two segments ahead of the vehicle, the output unit to output a notification of approaching the segment of interest, and instruct the vehicle to perform driving assistance in the segment immediately before the segment of interest.

Here, the processor may determine, by comparing an actual driving fuel efficiency with the driving assistance in the segment in which the driving assistance is performed and a prestored reference fuel efficiency information, whether a difference between the actual driving fuel efficiency and the reference fuel efficiency information is greater than a threshold value and update, when the difference between the actual driving fuel efficiency and the reference fuel efficiency information is greater than the threshold value, the server by subdividing the segment of interest.

Here, the processor may update, when the difference between the actual driving fuel efficiency and the reference fuel efficiency information is less than the threshold value, by merging segments.

Here, the segment of interest may be a segment in which a cumulative curvature or a gradient exceeds a segment delimitation criterion by a predetermined range or more.

Here, the predetermined distance may be 100 m, the predetermined threshold of curvature accumulation may be 10 degrees, and the predetermined threshold of gradient variation ratio may be 1%.

Here, the driving assistance may include control of acceleration or deceleration of the vehicle.

Here, the processor may subdivide the segment of interest such that all subdivided segments do not exceed the predetermined cumulative curvature threshold or the predetermined gradient variation ratio threshold.

Here, the processor may merge the segment of interest such that the merged segment does not exceed, in length, a predetermined maximum segment length.

According to various embodiments of the present disclosure as described above, it is possible to provide the driver with an optimal driving route by defining a segment and flexibly updating the segment based on curvature and gradient.

It is also possible to provide the driver with an optimal driving route in consideration of the number of vehicle stops caused by traffic volume and traffic lights on the road.

The advantages of the present disclosure are not limited to the aforesaid, and other advantages not described herein may be clearly understood by those skilled in the art from the descriptions below.

DETAILED DESCRIPTION

Hereinafter, descriptions are made of the embodiments disclosed in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical sprit disclosed herein, and it should be understood that the embodiments include all changes, equivalents, and substitutes within the sprit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Figure 1:
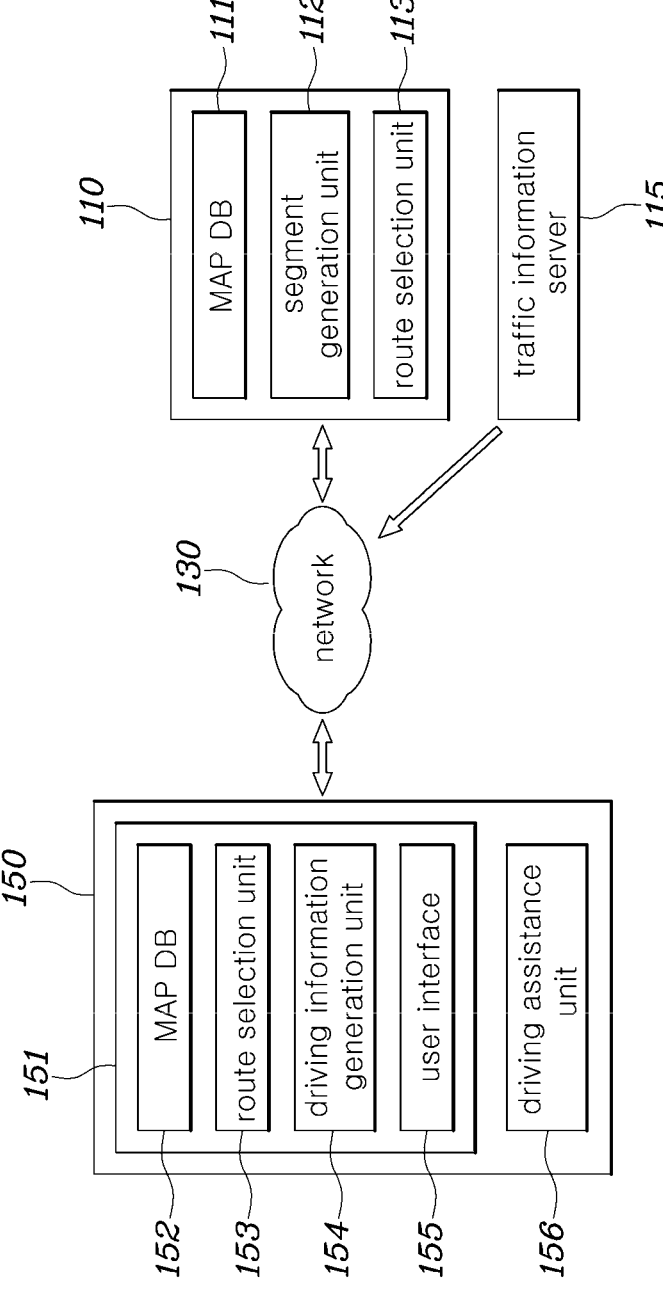
FIG. 1 is a block diagram illustrating an example of a vehicle driving information and driving assistance provision system according to an embodiment of the present disclosure.

FIG. 1 is a block diagram illustrating an example of a vehicle driving information and driving assistance provision system according to an embodiment of the present disclosure.

With reference to FIG. 1, a vehicle driving information and driving assistance provision system according to an embodiment of the present disclosure includes a telematics server 110, a traffic information server 115, a network 130, and a vehicle 150.

The telematics server 110 provides a map, driving-related information, driving route, and the like, around the vehicle for selecting a route from the current location or a departure point to a destination. The telematics server 110 includes a map database (MAP DB) 111, a segment generation unit 112, and a route selection unit 113.

The MAP DB 111 stores map information and provides the stored map information at the request of the vehicle 150.

The segment generator 112 divides each road section on the map into a plurality of segment units, and manages information on the segment and fuel efficiency information for each segment. Hereinafter, a description is made of the segment division method of the segment generator 112 in detail.

The route selection unit 113 selects an optimal driving route from the current location or departure point of the vehicle 150 to the destination and provides it to the vehicle 150.

Here, the route selection unit 113 may select multiple candidate routes from the current location or departure point of the vehicle 150 to the destination, receive per-candidate route segment information and fuel efficiency information from the segment generation unit 112, calculate per-segment average driving speed and number of stops, and provide the best driving rout based on the received fuel efficiency information, calculated average driving speed, and number of stops.

Figure 2:
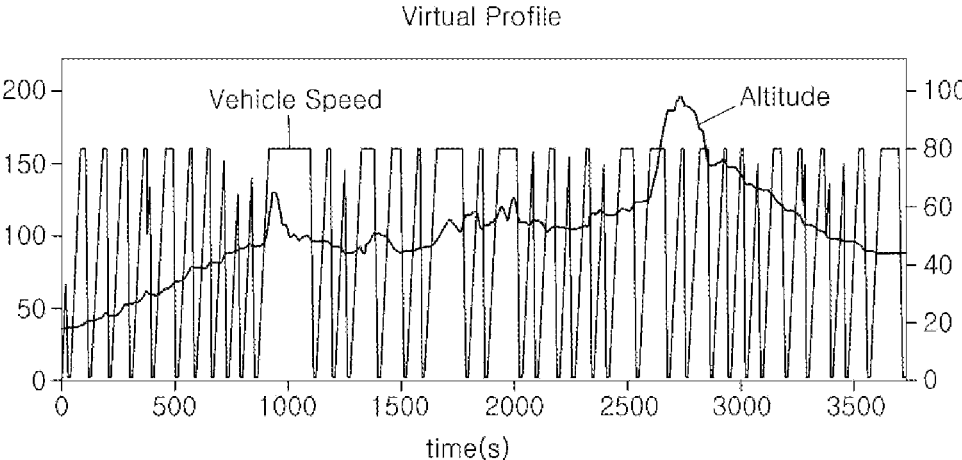
FIG. 2 exemplarily shows a simulation result of average speed and arrival time to a destination according to a number of stops of the vehicle in a driving section from an arbitrary departure point to the destination.
Figure 3:
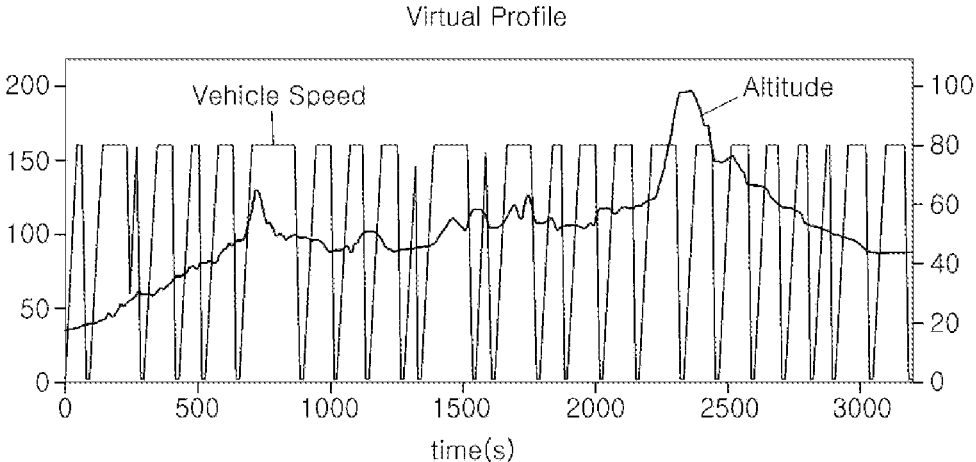
FIG. 3 exemplarily shows another simulation result of average speed and arrival time to a destination according to a number of stops of the vehicle in a driving section from an arbitrary departure point to the destination.
Figure 4:
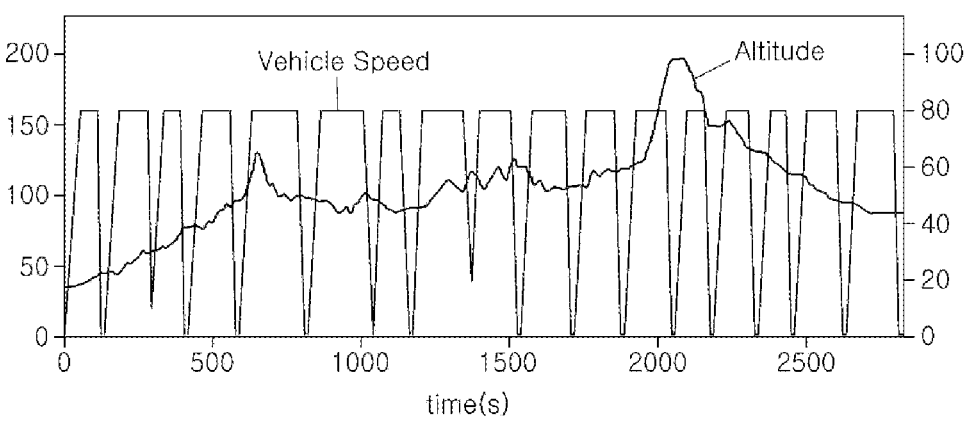
FIG. 4 exemplarily shows another simulation result of average speed and arrival time to a destination according to a number of stops of the vehicle in a driving section from an arbitrary departure point to the destination.

FIGS. 2 to 4 exemplarily show the simulation results of average speed and arrival time to a destination according to a number of stops of the vehicle in a driving section from an arbitrary departure point to the destination.

Here, a plurality of intersections may exist within the driving section of the vehicle, and the vehicle may stop at a specific intersection according to real-time traffic information, traffic light information, and the like, and may not stop at other specific intersections. Depending on traffic conditions, the vehicle may also stop at a place other than an intersection.

FIG. 2 shows the speed change and arrival time of a vehicle assuming that the vehicle stops at every intersection at intervals of 300 m or more in the vehicle driving section, and FIG. 3 shows the speed change and arrival time of the vehicle assuming that the vehicle stops at every intersection at intervals of 1000 m or more in the vehicle driving section. Also, FIG. 4 shows the speed change and arrival time of the vehicle assuming that the vehicle stops at every intersection at intervals of 2000 m or more in the vehicle driving section. Here, assuming that the vehicle stops at every intersection at intervals of a certain distance or more does not necessarily require that the distance between intersections exceed 300 m but may mean that the average distance between stops is assumed to be a certain distance.

Meanwhile, it took about 3700 seconds to arrive at the destination in the driving of the vehicle of FIG. 2, about 3200 seconds in the driving of FIG. 3, and about 2800 seconds in the driving of FIG. 4. Therefore, it may be possible to identify that it takes more time to arrive at the destination as the number of stops increases.

Meanwhile, as a result of the simulation of FIGS. 2 to 4, the fuel consumption was predicted to be 32.0 L in the driving pattern of FIG. 2, 25.6 L in the driving pattern of FIG. 3 and 21.3 L in the driving pattern of FIG. 4. As a result of the simulation, it is possible to identify that the more the number of stops of the vehicle in the same section, the longer it takes to arrive at the destination, and the greater the fuel consumption. This means that it is possible to navigate a route with improved fuel efficiency by taking into consideration of the number of stops of the vehicle.

With reference back to FIG. 1, the route selection unit 113 may receive real-time traffic information on the vehicle's driving route and information on a traffic light from the traffic information server 115 to calculate the actual driving fuel consumption, the average driving speed, and the number of stops.

Figure 5:
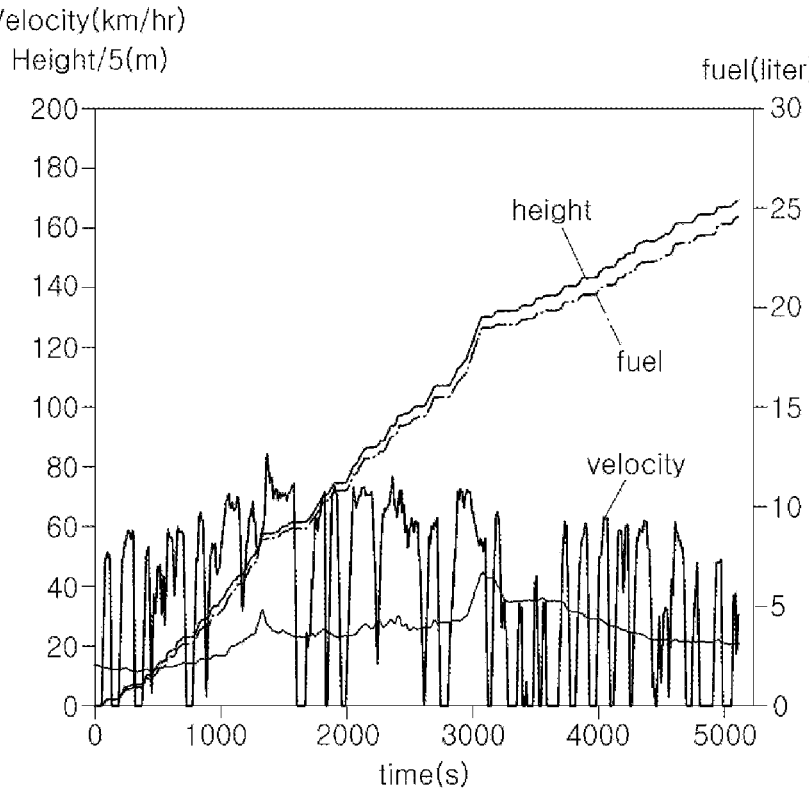
FIG. 5 exemplarily shows the amount of fuel consumed during actual driving in the specific driving section illustrated in FIGS. 2 to 4.

FIG. 5 exemplary shows a result of predicting the actual driving fuel consumption, the average driving speed, and the number of stops for an arbitrary driving route according to an embodiment of the present disclosure. It is possible to identify that about 25 L of fuel are consumed in the driving route exemplified in FIG. 5. The route selection unit 113 may select a plurality of driving route candidates for a driving rout from a specific departure point to a destination, predict fuel consumption for each driving route candidate, select the driving route with the least fuel consumption, and provide information on the selected driving route to the driver of the vehicle 150.

Meanwhile, the segment generation unit 112 may divide and define the entire driving route from the starting point to the destination into a plurality of segments, and predict the fuel consumption for each segment, i.e., calculate fuel efficiency.

Here, the segment generation unit 112 may divide the entire driving route into segments in consideration of a distance, a curvature shape, and a gradient shape.

In this case, the segment generation unit 112 may divide the driving route into segments based on the distance as a basic principle and, in addition, by combining the cumulative curvature and the gradient average.

Figure 6:
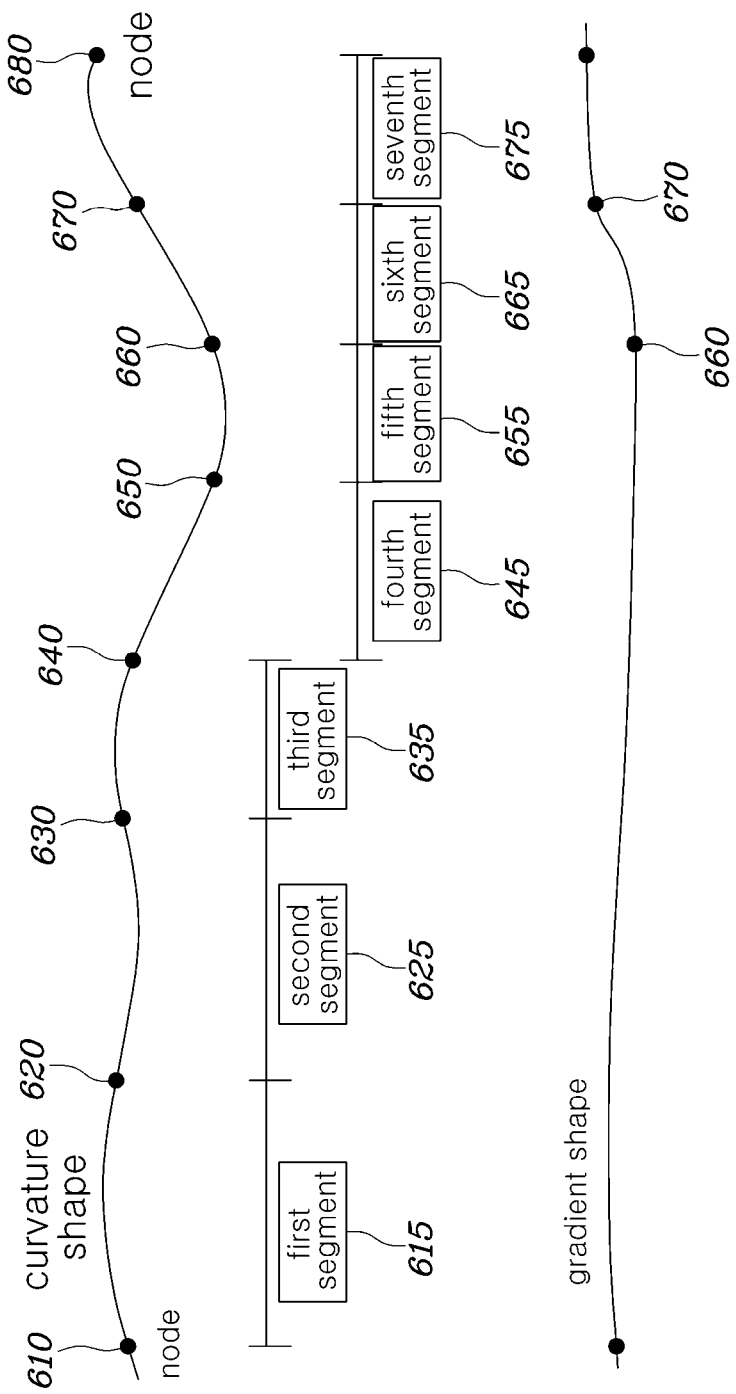
FIG. 6 exemplarily illustrates a method of dividing a driving route into segments for calculating fuel efficiency according to an embodiment of the present disclosure.

FIG. 6 exemplarily illustrates a method of dividing a driving route into segments for calculating fuel efficiency according to an embodiment of the present disclosure.

In FIG. 6, the starting point may be defined as a first node 610, the subsequent segment division points may be sequentially defined as second to eighth nodes 620, 630, 650, 660, 670, and 680, and the section from the first node 610 to the second node 620 may be defined as a first segment 615 and the section from the second node 620 to the third node 630 may be defined as a second segment 625, and the subsequent sections may be defined as the third to seventh segments 635, . . . , 675 in the same manner.

With reference to FIG. 6, the segments may be delimited at every 100 m from the first node 610 and, even if they do not exceed 100 m from a segment division point, the segments may be delimited at points where the cumulative curvature or gradient exceed a certain criterion. For example, a segment may be delimited at a point where the circumferential angle accumulated from one node, i.e., the cumulative curvature, is greater than 10 degrees.

Meanwhile, the cumulative curvature may use a percentage unit as a cumulative value for the curvature, and the segment may be delimited, for example, at a point where the cumulative curvature exceeds 10%.

Also, a segment may be delimited at a point where the gradient fluctuates by more than 1% relative to the gradient average of the previous segment. For example, the unit of gradient can be expressed in per mil, and thus a ramp with a base of 1000 m and a height of n m can be expressed as n per mil. For example, comparing the gradient of the current segment with the gradient average of the previous segment, if the gradient varies rapidly by more than 10 per mil, i.e., by more than 1% in proportion, a segment may be delimited.

In FIG. 6, the first segment 615 from the first node 610 to the second node 620 and the second segment 625 from the second node 620 to the third node 630 may each be delimited as a segment of 100 m as predetermined segmentation criterion because the cumulative curvature or the gradient average does not exceed the reference value.

Meanwhile, the third segment 635 from the third node 630 to the fourth node 640 may be designated as one segment before reaching 100 m from the third node 630 because the cumulative curvature at the fourth node 640 exceeds 10 degrees.

In addition, the fourth segment 645 may be designated as one segment having a distance of 100 m from the fourth node 640 to the fifth node 650 because the cumulative curvature or gradient average does not exceed the reference value during the 100 m from the fourth node 640 to the fifth node 650.

In addition, the fifth segment 655 from the fifth node 650 to the sixth node 660 may be designated as one segment before reaching 100 m from the fifth node 650 because the cumulative curvature at the point of the sixth node 660 exceeds 10 degrees.

In addition, the sixth segment (665) from the sixth node 660 to the seventh node 670 may be designated as one segment before reaching 100 m from the sixth node 660 because the gradient average fluctuates by more than 1% at the point of the seventh node 670.

In addition, the seventh segment 675 may be designated as one segment having a distance of 100 m from the seventh node 670 to the eighth node 680 because the cumulative curvature or gradient average does not exceed the reference value during the 100 m from the seventh node 670 to the eighth node 680.

Here, the segment generation unit 112 may determine whether the cumulative curvature or the gradient average exceeds a predetermined threshold value at predetermined intervals based on the previous node. For example, the segment generation unit 112 may determine whether the cumulative curvature or gradient variation ratio exceeds a threshold value in a section of every 10 m from the previous node and delimit a segment at the point where the cumulative curvature accumulation or gradient variation ratio exceeds the threshold value as one segment.

With reference back to FIG. 1, the segment generation unit 112 may divide the driving section from the starting point to the destination into a plurality of segment units in the same manner as described above, and calculate and store per-segment reference fuel efficiency information.

The route selection unit 113 may receive the per-segment reference fuel efficiency information from the segment generation 112, calculate the drivable speed and the number of stops per segment, and select an optimal route based thereon. The optimal path selected by the path selection unit 113 may be transmitted to the vehicle 150 through the network 130.

The traffic information server 115 provides traffic information based on a plurality of candidate routes from the current location of the vehicle 150 or the departure point to the destination.

The network 130 collects information received from the telematics server 110 and the traffic information server 115 and transmits the information to the vehicle 150.

The vehicle 150 provides the driver with information about a driving route, a notification, a driving assistance, etc., and receives information for this provision from the telematics server 110 or the traffic information server 115. The vehicle 150 includes an audio, video, and navigation (AVN) 151 and a driving assistance unit 156.

The AVN 151 includes a map database (MAP DB) 152, a route selection unit 153, a driving information generation unit 154, and a user interface 155.

The map database 152 stores map information, and provides map information necessary for the route selection unit 153 to select a driving route or for the driving information generation unit 154 to determine whether to approach an area of interest.

The route selection unit 153 may receive the optimal driving route from the current location or departure point of the vehicle 150 to the driver's destination from the route selection unit 113 of the telematics server 110 or directly select the optimal driving route and provide it to the driver through the user interface 155.

Here, the route selection unit 153 may select the optimal driving route in the same manner as the route selection unit 113 of the telematics server 110 described above selects the optimal driving route from the current location or departure point of the vehicle to the destination.

Meanwhile, the vehicle 150 may travel along the optimal driving route selected by the route selection unit 113 of the telematics server 110 or the route selection unit 153 of the vehicle 150.

The driving information generation unit 154 may inform, when there is a segment of interest on the driving rout of the vehicle 150, the driver that the vehicle 150 approaches the segment of interest before two segments from the segment of interest.

Here, the driving information generation unit 154 may define a segment of interest for which the information value of the corresponding segment exceeds a certain range of segment segmentation criteria. For example, a segment in which cumulative curvature or gradient variation ratio exceeds a segment segmentation criterion by 100% or more may be designated as a segment of interest.

Figure 7:
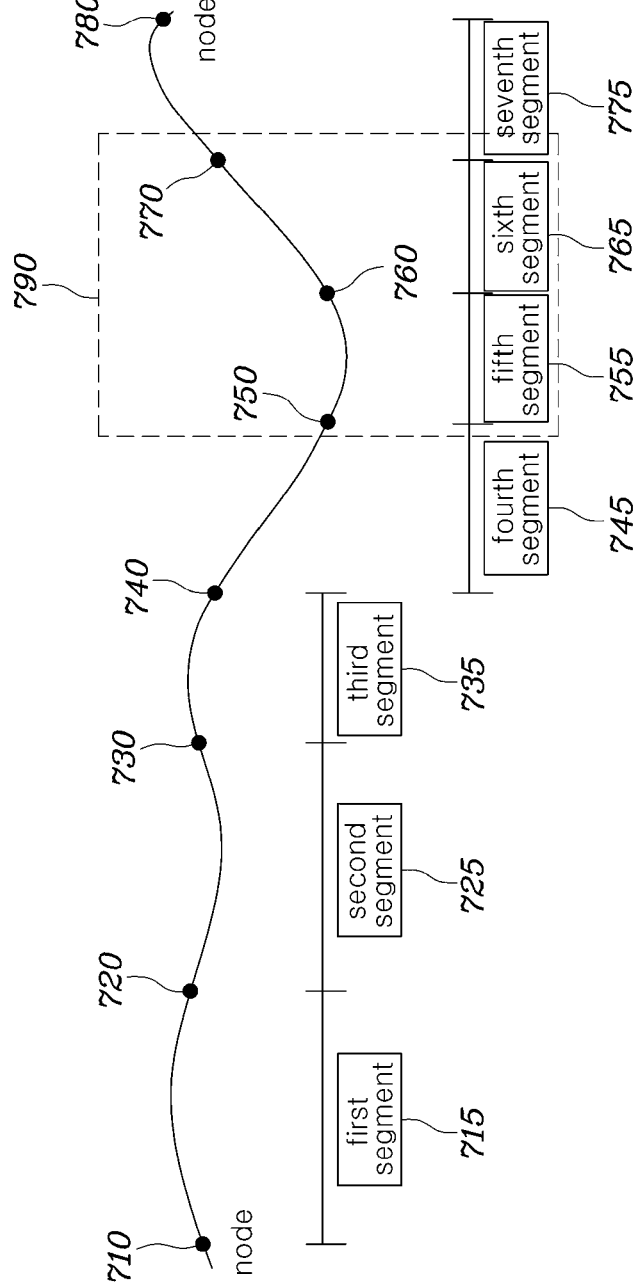
FIG. 7 exemplarily illustrates a method of assisting announcement or automatic driving before approaching a specific segment according to an embodiment of the present disclosure.

FIG. 7 exemplarily illustrates a method of assisting announcement or automatic driving before approaching a specific segment according to an embodiment of the present disclosure. With reference to FIG. 7, first to seventh segments 715, 725, . . . , 775 corresponding to segments divided by first to eighth nodes 710, 720, . . . , 780 may exist on the driving route of the vehicle 150. Of all segments of FIG. 7, the first, second, fourth, and seventh segments 715, 725, 745, and 775 are delimited as segments with a length of 100 m, and the third, fifth, and sixth segments 735, 755, and 765 have a length shorter than 100 m, but have a cumulative curvature or gradient variation ratio satisfying the segment delimitation criterion. For example, it may be assumed that the third segment 735 has the cumulative curvature of 15 degrees, the fifth segment 755 has the cumulative curvature of 27 degrees and the gradient of 0, and the sixth segment 765 has the gradient of 4%, i.e., 40 per mill. In this case, the third segment 735 does not correspond to a segment of interest because the cumulative curvature does not exceed 100% of 10 degrees as the segment delimitation criterion. Meanwhile, the fifth segment 755 may corresponds to a segment of interest because of having the cumulative curvature of 27 degrees that exceeds 100% or more compared to the segment delimitation criterion of 10 degrees. In addition, the sixth segment 765 may corresponds to a segment of interest because of having the gradient variation ratio of 4% that exceeds 100% or more compared to the segment delimitation criterion of 1%.

Here, the driving information generation unit 154 may notify the driver of the approach of the segment of interest when the vehicle 150 is driving in the third segment 735 that is two segments before the fifth segment 755.

In this case, when the vehicle 150 arrives at the third node 730 as the starting point of the third segment 735, the driving information generation unit 154 may notify the driver of approaching the segment of interest.

Here, the driving information generation unit 154 may transmit a control signal to the user interface 155 such that the user interface 155 notifies the driver of approaching the segment of interest through a screen or voice guidance.

Meanwhile, the driving information generation unit 154 may update information on the segment based on driving section information, a real driving pattern, and per-segment fuel efficiency information that are acquired during driving after the vehicle 150 completes driving through the corresponding driving section.

Here, when the driving section passed through does not meet the predefined segment delimitation criterion, the driving information generation unit 154 may reset the segments such that the corresponding driving section conforms to the predefined segment delimitation criterion.

Meanwhile, when the vehicle 150 approaches and passes through the segment of interest while driving, the driving assistance unit 156 may be automatically involved to assist driving control and, at this time, the driving information generation unit 154 may compare the driving-assisted actual driving fuel efficiency with the pre-stored reference fuel efficiency information.

The driving information generation unit 154 may update the information in the server 110 by subdividing the segment of interest when the difference between the actual driving fuel efficiency and the reference fuel efficiency information, i.e., the fuel efficiency improvement effect, exceeds a predetermined threshold value.

For example, the driving information generation unit 154 may divide the segment of interest into two or more such that the cumulative curvature or gradient average of one segment does not exceed 10% of the segment delimitation criterion.

Meanwhile, when the difference between the actual driving fuel efficiency and the reference fuel efficiency information does not exceed a predetermined threshold value, the driving information generation 154 may merge a plurality of adjacent segments of interest to update the information thereon. In this case, the driving information generation unit 154 may determine whether the length of a plurality of merged segments of interest exceeds a reference segment length and merge the plurality of segments of interest only when the length of the plurality of merged segments the length does not exceed the reference segment length. For example, the driving information generation unit 154 may be set to merge a plurality of segments of interest only when the length of the segments to merge does not exceed 100 m.

Figure 8:
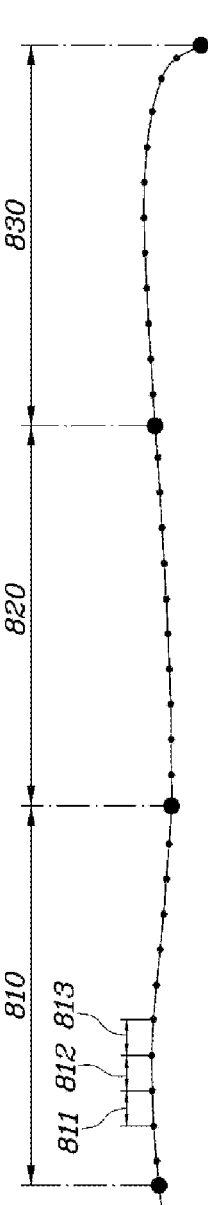
FIG. 8 exemplarily illustrates a method of defining a U-segment by integrating a plurality of segments according to an embodiment of the present disclosure.

Meanwhile, the driving information generation unit 154 may merge a plurality of segments and define the merged segments as a U-segment as a minimum unit fuel efficiency map section. FIG. 8 exemplarily illustrates a method of defining a U-segment by integrating a plurality of segments according to an embodiment of the present disclosure. With reference to FIG. 8, the first to third U-segments 810, 820, and 830 may each include a plurality of segments, e.g., the first U-segment 810 may include a plurality of segments 811, 812, and 813.

Here, the U-segments may be configured for the purpose of displaying a high-level fuel efficiency map of the provisioning system and the Vehicle Monitoring System (VMS) screen unit, and one U-segment may be set, for example, in a range not exceeding 1000 m. That is, a fuel efficiency map system may be configured to display integrated fuel efficiency value per U-segment on the map.

Here, the U-segments may be stored and managed in the server along with respective curvatures and gradients, and it is not necessary to separate and manage the U-segments according to the curvature and gradient.

Here, geometry information may be configured as a vertex at which a start point and an end point of the segments constituting the U-segment subdivide the U-segment.

In this case, the U-segment may be configured only for the first course (Lane No. 1) of a precise road map.

The user interface 155 may provide a map on the screen for navigation and may receive a destination input from the driver with voice or a touch screen. In addition, the user interface 155 provides the driver with optimal driving route guidance and a notification of approaching an area of interest through a screen display or voice announcement.

The driving assistance unit 156 may automatically assist driving when the vehicle 150 approaches and passes a segment of interest while driving.

Here, the driving assistance unit 156 may be an advanced driver assistance system (ADAS) of the vehicle 150 or an autonomous driving controller.

Here, the automatic driving assistance of the driving assistance unit 156 may include control of acceleration or deceleration of the vehicle 150.

For example, the driving assistance unit 156 may automatically control the acceleration or deceleration of the vehicle 150 in a segment immediately before the segment of interest.

For example, the driving assistance unit 156 may automatically control the acceleration or deceleration of the vehicle 150 at the starting point of the segment immediately before the segment of interest.

Figure 9:
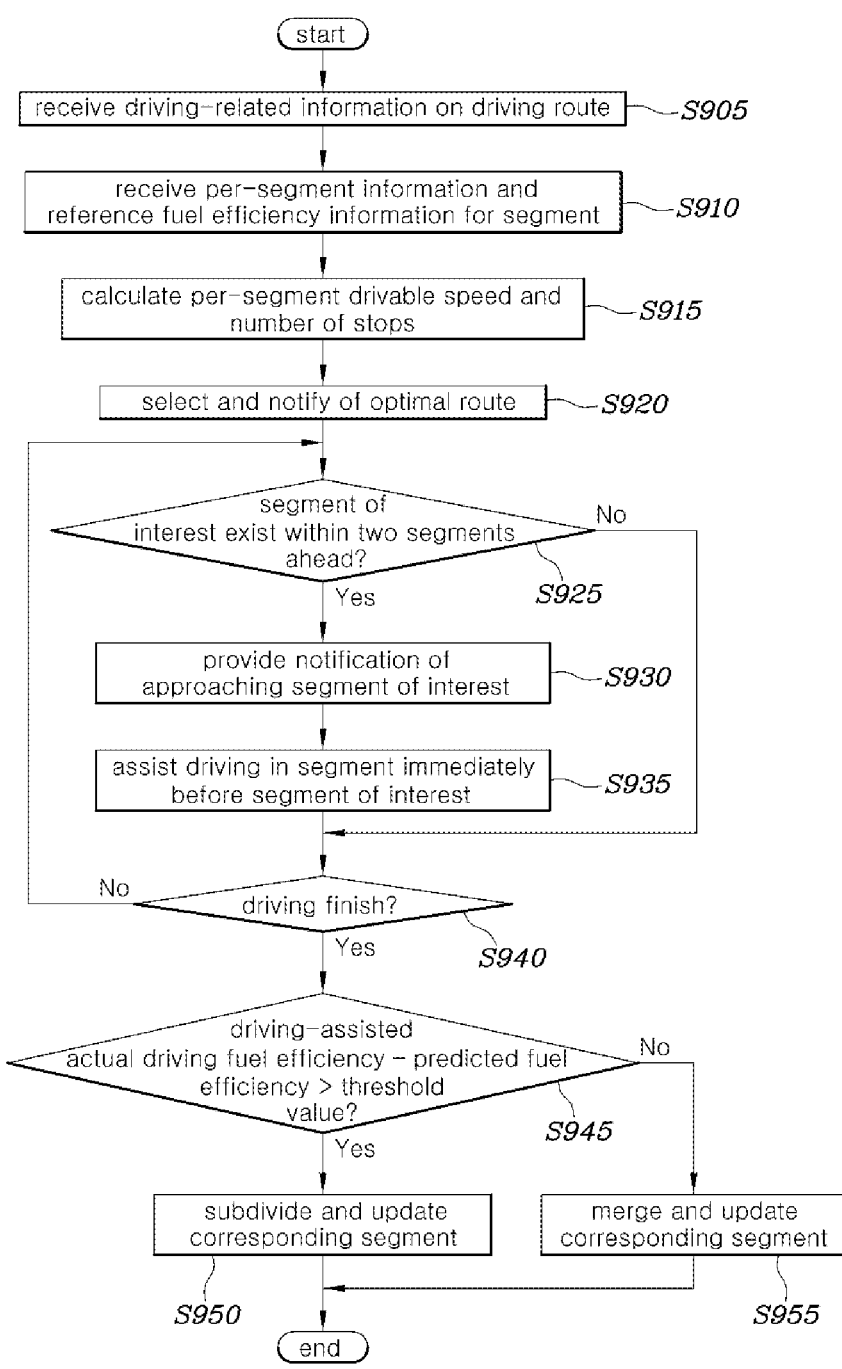
FIG. 9 is a flowchart illustrating a method of providing driving information and driving assistance according to an embodiment of the present disclosure.

FIG. 9 is a flowchart illustrating a method of providing driving information and driving assistance according to an embodiment of the present disclosure. The method for providing driving information and driving assistance according to the present disclosure may be performed by a part of the vehicle 150 of FIG. 1 and may be performed by the AVN 151 of the vehicle 150. Also, some of these steps may be performed by the route selection unit 113 of the telematics server 110.

With reference to FIG. 9, the vehicle 150 or the server 110 receives, at step S905, driving-related information on at least one driving route from a departure point of the vehicle 150 to a destination from at least one server.

Here, the driving-related information may include at least one of real-time traffic information, average speed or signal information, or a combination thereof.

Here, the real-time traffic information may be received from the traffic information server 115.

Here, the average speed and signal information may be received from the map database 111.

Next, the vehicle 150 or the server 110 receives, at step S910, per-segment reference fuel efficiency information on at least one segment generated by segmenting the driving route.

Here, the per-segment information and per-segment reference fuel efficiency information may be received from the segment generation unit 112.

Here, the segments may respectively be segments generated by the segment generation unit 112 according to the delimitation criterion as described with reference to FIG. 6 and related explanation.

For example, each of the above segments may be defined to terminate the segment and start a new segment when the distance from the start point of the segment exceeds a predetermined threshold, the cumulative curvature exceeds a predetermined threshold, or the gradient average fluctuates more than a predetermined threshold.

Next, the vehicle 150 or the server 110 calculates, at step S915, the drivable speed and the number of stops for each segment based on the real-time traffic information, average speed, and signal information.

The vehicle 150 or the server 110 also selects, at step S920, an optimal route based on the reference fuel efficiency information received at step S910 and the drivable speed and number of stops calculated at step S915 to guide the driver.

Here, in the case where the optimal route selection and guidance on the selected route are performed by the vehicle 150, the route selection may be performed by the route selection unit 153, and the guidance on the selected route may be performed with the screen or voice through the user interface 155.

Here, in the case where the optimal path selection is performed by the server 110, the vehicle 150 may receive the selected optimal path information from the server 110 and guide the selected path with the screen or voice through the user interface 155. Here, the optimal path information generated by the server 110 may be transmitted to a separate user terminal (UE), and guidance may be performed by the user terminal (UE).

The vehicle 150 may travel on the road according to the optimal driving route selected through steps S905 to S920, and the subsequent steps may be performed while the vehicle 150 is traveling.

Next, the vehicle 150 determines at step S925 whether a segment of interest exists within two segments ahead.

Here, the vehicle 150 may determine the characteristics of the segment located ahead of the current segment passing currently and the next segment and may determine, based on this, whether a segment of interest exists within the two segments ahead.

Here, a segment of which the information value exceeds a predetermined segment delimitation criterion by a predetermined range or more may be defined as a segment of interest. For example, when the cumulative curvature or gradient average of the segment exceeds the segment delimitation criterion by 100% or more, the segment may be designated as a segment of interest.

When it is determined at step S925 that there is a segment of interest within the two segments ahead, the vehicle 150 provides, at step S930, a notification of approaching the segment of interest and performs, at step S935, driving assistance in the segment immediately before the segment of interest.

Here, the driving assistance may include control of acceleration or deceleration of the vehicle 150.

Next, the vehicle 150 may determine at step S940 whether the driving is finished, repeating steps S925 to S935 until the driving is finished.

When the driving is finished, the vehicle 150 compares the driving-assisted actual driving fuel efficiency and the pre-stored reference fuel efficiency information for the segments in which the driving assistance has been performed, determines at step S945 whether the difference between the actual driving fuel efficiency and the reference fuel efficiency information exceeds the threshold, and subdivides at step S950, when the difference between the actual driving fuel efficiency and the reference fuel efficiency information exceeds the threshold, the segment of interest and updates the server with the subdivision.

When subdividing the segment of interest, the driving information generating unit 154 may subdivide the segment such that all of the subdivided segments do not exceed a predetermined cumulative curvature threshold or a predetermined gradient change threshold.

For example, the driving information generation unit 154 may subdivide the segment so that the cumulative curvature of all the subdivided segments does not exceed 10 degrees or the road gradient does not change by more than 1% with respect to the average gradient of the previous segment.

Meanwhile, when the difference between the actual driving fuel efficiency and the reference fuel efficiency information does not exceed the predetermined threshold value, the driving information generation unit 154 merges, at step S955, a plurality of adjacent segments of interest and updates the server with the merge.

When merging the segments of interest, the driving information generation unit 154 may merge the segments such that the length of the merged segment does not exceed the predetermined maximum segment length. For example, the driving information generation unit 154 may be set to merge a plurality of segments of interest such that the length of the merged segments does not exceed 100 m.

Figure 10:
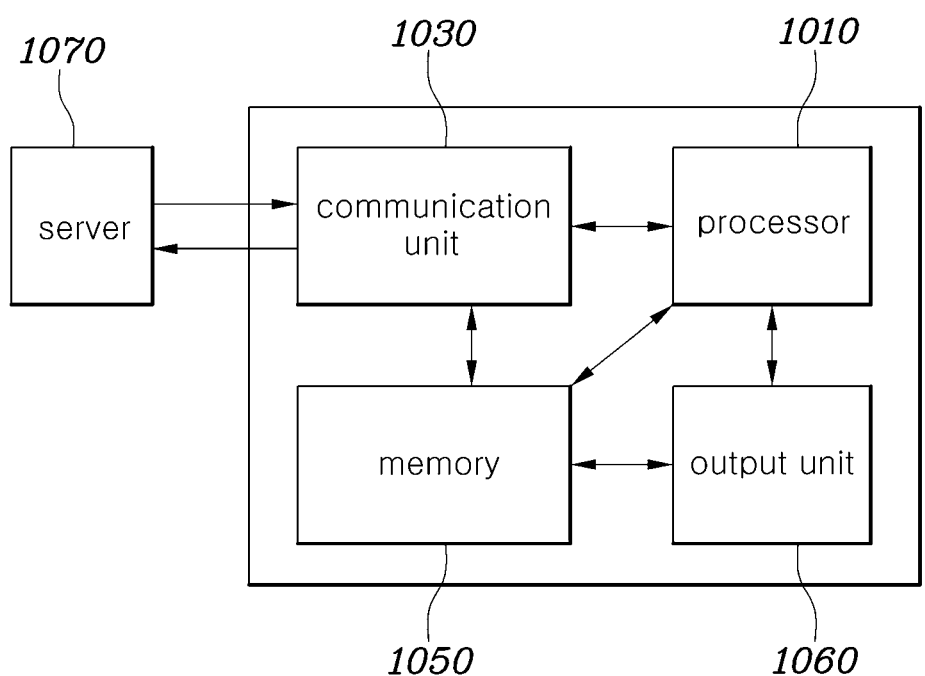
FIG. 10 is a block diagram illustrating an example of a computer system according to an embodiment of the present disclosure.

FIG. 10 is a block diagram illustrating an example of a computer system according to an embodiment of the present disclosure.

With reference to FIG. 10, an embodiment of the present disclosure may be implemented in a computer system such as a computer-readable recording medium. As shown in FIG. 10, the computer system 1000 includes a processor 1010, a communication unit 1030, a memory 1050, and an output unit 1060, and the communication unit 1030 communicate with an external server 1070.

The processor 1010 implements the vehicle driving information provision and driving assistance method proposed in this specification. In detail, the processor 1010 implements all operations of the AVN described in the embodiments disclosed herein and performs some or all operations of the vehicle driving information provision and driving assistance method according to FIG. 9.

For example, the processor 1010 receives per-segment information on segments generated by segmenting the driving route into at least one segment and reference fuel efficiency information on the segment from the server, calculates the drivable speed and the number of stops per segment based on at least one of the real-time traffic information, average speed or signal information, or a combination thereof, and selects the best route based on the reference fuel efficiency information, the drivable speed, and the number of stops.

Here, each segment may be terminated and a new segment may be started at a predetermined distance away from the start point of the segment or when the cumulative curvature exceeds a predetermined threshold or when the road gradient fluctuates more than a predetermined threshold ratio compared to the gradient average of the previous segment.

Here, the processor 1010 may determine whether there is a segment of interest within two segments ahead of the vehicle, instruct, when there is a segment of interest within two segments ahead of the vehicle, the output unit 1060 to output a notification about approaching the segment of interest, and instruct to perform the driving assistance for the vehicle in the segment immediately before the segment of interest.

Here, the processor 1010 may compare the driving-assisted actual driving fuel efficiency and the pre-stored reference fuel efficiency information for the segment in which the driving assistance has been performed, determine whether the difference between the actual driving fuel efficiency and the reference fuel efficiency information exceeds a predetermined threshold value, and subdivide, when the difference between the actual driving fuel efficiency and the reference fuel efficiency information exceeds the threshold, the segment of interest and update the server with the subdivision.

Here, when the difference between the actual driving fuel efficiency and the reference fuel efficiency information is less than the threshold value, the processor 1010 may merge and update the segments in which the driving assistance has been performed.

Here, the segment of interest may be a segment in which the cumulative curvature or gradient of the corresponding segment exceeds the segment delimitation criterion by a predetermined range or more.

Here, the predetermined distance may be 100 m, the predetermined cumulative curvature threshold may be 10 degrees, and the predetermined gradient variation ratio threshold may be 1%.

Here, the driving assistance may include control for acceleration or deceleration of the vehicle.

When subdividing the segment of interest, the processor 1010 may subdivide the segment such that all the subdivided segments do not exceed the predetermined cumulative curvature threshold or the predetermined gradient variation ratio threshold.

When merging the segments of interest, the processor 1010 may merge the segments such that the length of the merged segment does not exceed the predetermined maximum segment length.

The communication unit 1030 is connected to the processor 1010 to obtain information directly or transmit and/or receive information to/from the server 1070. For example, the communication unit 1030 receives at least one of real-time traffic information, average speed or signal information for at least one driving route from the departure point of the vehicle to the destination, or a combination thereof. The communication unit 1030 also receives, from the server 1070, per-segment information of the segments generated by segmenting the driving route into at least one segment, and reference fuel efficiency information of the segment.

The memory 1050 may be various types of volatile or non-volatile storage media. Here, the memory 1050 may store at least one of real-time traffic information and average speed or signal information for at least one driving route from the departure point to the destination that are received from the server 1070 or a combination thereof. The memory 1050 may also store per-segment information on the segments generated by segmenting the driving route into at least one segment and reference fuel efficiency information per the segment that is received from the server 1070.

The output unit 1060 outputs a notification of the optimal driving route selected by the processor 1010 and/or approaching the segment of interest.

According to the embodiments of the present disclosure described hereinabove, it is possible to provide the driver with an optimal driving route by defining and flexibly updating segments based on curvature and gradient.

In addition, it is possible to provide the driver with an optimal driving route in consideration of the number of vehicle stops caused by traffic volume and traffic lights on the road.

Meanwhile, the present disclosure described above may be implemented as computer-readable codes on a medium on which a program is recorded. Computer-readable media include all types of recording devices in which data readable by a computer system are stored. Examples of the computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects but as exemplary. The scope of the present invention should be determined by a reasonable interpretation of the appended claims and includes all modifications within the equivalent scope of the present disclosure.

What is claimed is:

1. A method for providing driving information of a vehicle and assisting driving the vehicle, the method comprising:

receiving traffic information on a driving route from a departure point of the vehicle to a destination from at least one server;

receiving per-segment information of at least one segment generated by segmenting the driving route and per-segment reference fuel efficiency information;

calculating a drivable speed and a number of stops per segment based on the traffic information;

notifying a driver of an optimal route selected based on the reference fuel efficiency information, the drivable speed, and the number of stops;

determining whether a segment of interest exists ahead of the vehicle, wherein the segment of interest is a segment in which a cumulative curvature or a road gradient exceeds a segment delimitation criterion by a predetermined range or more, wherein the segment delimitation criterion is a predefined amount of cumulative curvature or a predefined amount of road gradient;

performing driving assistance for the vehicle in a segment immediately before the segment of interest;

determining, by comparing an actual driving fuel efficiency with the driving assistance in the segment in which the driving assistance is performed and a prestored reference fuel efficiency information, whether a difference between the actual driving fuel efficiency and the prestored reference fuel efficiency information is greater than a threshold value; and updating, when the difference between the actual driving fuel efficiency and the reference fuel efficiency information exceeds the threshold value, the server by subdividing the segment of interest and storing a subdivision resulting from subdividing the segment of interest together with corresponding fuel efficiency information, wherein each segment is configured to terminate and to start a new segment when the cumulative curvature exceeds a predetermined threshold or when the road gradient varies more than a predetermined threshold ratio compared to a gradient average of a previous segment.

2. The method of claim 1, wherein each segment is further configured to terminate and to start the new segment at a predetermined distance away from a start point of the segment.

3. The method of claim 1, further comprising:

determining whether a segment of interest exists within two segments ahead of the vehicle; and notifying, when a segment of interest exists within two segments ahead of the vehicle, the driver of approaching the segment of interest.

4. The method of claim 1, further comprising merging and updating segments for a driving section in which the driving assistance is performed, when the difference between the actual driving fuel efficiency and the reference fuel efficiency information is less than the threshold value.

5. The method of claim 2, wherein the predetermined distance is 100 m, the predetermined threshold of curvature accumulation is 10 degrees, and the predetermined threshold of gradient variation ratio is 1%.

6. The method of claim 3, wherein the driving assistance includes control of acceleration or deceleration of the vehicle.

7. The method of claim 1, wherein the segment of interest is subdivided such that all subdivided segments do not exceed the predetermined cumulative curvature threshold or the predetermined gradient variation ratio threshold.

8. The method of claim 4, wherein the segment of interest is merged such that the merged segment does not exceed, in length, a predetermined maximum segment length.

9. A vehicle providing driving information and driving assistance, the vehicle comprising:

a communication unit configured to receive traffic information on a driving route from a departure point of the vehicle to a destination, per-segment information of at least one segment generated by segmenting the driving route, and per-segment reference fuel efficiency information from at least one server;

a processor configured to calculate a drivable speed and a number of stops per segment based on the traffic information, configured to select an optimal route based on the reference fuel efficiency information, the drivable speed, and the number of stops, configured to determine whether a segment of interest exists ahead of the vehicle, and configured to instruct the vehicle to perform driving assistance in the segment immediately before the segment of interest, wherein the segment of interest is a segment in which a cumulative curvature or a gradient exceeds a segment delimitation criterion by a predetermined range or more, wherein the segment delimitation criterion is a predefined amount of cumulative curvature or a predefined amount of gradient; and an output unit configured to output the selected optimal route, wherein the processor is configured to determine, by comparing an actual driving fuel efficiency with the driving assistance in the segment in which the driving assistance is performed and a prestored reference fuel efficiency information, whether a difference between the actual driving fuel efficiency and the prestored reference fuel efficiency information is greater than a threshold value, and updates, when the difference between the actual driving fuel efficiency and the reference fuel efficiency information is greater than the threshold value, the server by subdividing the segment of interest and storing a subdivision resulting from subdividing the segment of interest together with corresponding fuel efficiency information, wherein each segment is configured to terminate and to start a new segment when the cumulative curvature exceeds a predetermined threshold or when the gradient varies more than a predetermined threshold ratio compared to a gradient average of a previous segment.

10. The vehicle of claim 9, wherein each segment is further configured to terminate and to start the new segment at a predetermined distance away from a start point of the segment.

11. The vehicle of claim 9, wherein the processor determines whether a segment of interest exists within two segments ahead of the vehicle, instructs, when a segment of interest exists within two segments ahead of the vehicle, the output unit to output a notification of approaching the segment of interest.

12. The vehicle of claim 1, wherein the processor 1s configured to merge updates for a driving section in which the driving assistance is performed, when the difference between the actual driving fuel efficiency and the reference fuel efficiency information is less than the threshold value.

13. The vehicle of claim 10, wherein the predetermined distance is 100 m, the predetermined threshold of curvature accumulation is 10 degrees, and the predetermined threshold of gradient variation ratio is 1%.

14. The vehicle of claim 11, wherein the driving assistance includes control of acceleration or deceleration of the vehicle.

15. The vehicle of claim 1, wherein the processor is configured to subdivide the segment of interest such that the subdivided segments do not exceed the predetermined cumulative curvature threshold or the predetermined gradient variation ratio threshold.

16. The vehicle of claim 12, wherein the processor is configured to merge the segment of interest such that the merged segment does not exceed, in length, a predetermined maximum segment length.

* * * * *